US012704153B2

(12) United States Patent
Kohara et al.

(10) Patent No.: US 12,704,153 B2
(45) Date of Patent: Aug. 11, 2026

(54) FLEXIBLE BOOT FOR CONSTANT VELOCITY UNIVERSAL JOINT AND CONSTANT VELOCITY UNIVERSAL JOINT

(71) Applicants: NTN CORPORATION, Osaka (JP); KEEPER CO., LTD., Kanagawa (JP)

(72) Inventors: Mika Kohara, Shizuoka (JP); Sho Takeshita, Shizuoka (JP); Hiroshi Murakami, Shizuoka (JP); Shuichi Sato, Kanagawa (JP); Rina Ozawa, Kanagawa (JP); Kouji Masujima, Kanagawa (JP)

(73) Assignees: NTN CORPORATION, Osaka (JP); KEEPER CO., LTD., Kanagawa (JP)

( * ) Notice: Subject to any disclaimer, the term of this patent is extended or adjusted under 35 U.S.C. 154(b) by 462 days.

(21) Appl. No.: 18/289,771

(22) PCT Filed: Apr. 27, 2022

(86) PCT No.: PCT/JP2022/019122
§ 371 (c)(1),
(2) Date: Jun. 25, 2024

(87) PCT Pub. No.: WO2022/239659
PCT Pub. Date: Nov. 17, 2022

(65) Prior Publication Data

US 2024/0337293 A1 Oct. 10, 2024

(30) Foreign Application Priority Data

May 11, 2021 (JP) ................................ 2021-080172

(51) Int. Cl.
*F16D 3/84* (2006.01)
*C08L 15/00* (2006.01)
(Continued)

(52) U.S. Cl.
CPC ............ *F16D 3/845* (2013.01); *C08L 15/005* (2013.01); *C08L 23/16* (2013.01); *F16J 3/041* (2013.01)

(58) Field of Classification Search
CPC .... C08L 15/005; C08L 23/16; F16C 11/0666; F16C 11/0671; F16C 11/0676;
(Continued)

(56) References Cited

U.S. PATENT DOCUMENTS 5,312,869 A * 5/1994 Nomura .................. C08L 23/16 525/193
6,942,223 B2 * 9/2005 Wang ...................... F16D 3/845 277/634
(Continued)

FOREIGN PATENT DOCUMENTS

JP 2-124951 5/1990
JP 10-159989 6/1998
(Continued)

OTHER PUBLICATIONS

European Search Opinion issued Oct. 10, 2024 in European (EP) Application No. EP 22 807 361.5. (Year: 2024).*
(Continued)

*Primary Examiner* — Josh Skroupa
(74) *Attorney, Agent, or Firm* — Wenderoth, Lind & Ponack, L.L.P.

(57) ABSTRACT

A flexible boot for a constant velocity universal joint includes: attachment portions to a mating member at both ends; and a bent portion provided between the attachment portions and absorbing deformation caused by operation of a constant velocity universal joint. The flexible boot is made of a rubber material obtained by blending 50 to 80 parts by weight of HNBR having an acrylonitrile content of 15 to 21 wt % and 20 to 50 parts by weight of EPDM, the rubber
(Continued)

material having an elastic recovery rate of 18% or more at −40° C. in a TR test.

4 Claims, 2 Drawing Sheets

(51) Int. Cl.
*C08L 23/16* (2006.01)
*F16J 3/04* (2006.01)

(58) Field of Classification Search
CPC . F16D 3/84; F16D 3/843; F16D 3/845; F16D 3/848; F16D 2003/846; F16D 2300/08; F16J 3/041; F16J 3/042; F16J 3/043; F16J 3/045; F16J 3/046; F16J 15/52; F16J 15/525; Y10T 403/31; Y10T 403/315; Y10T 403/32729
USPC ............ 464/173, 174, 175; 403/50, 51, 134; 277/634, 635, 636
See application file for complete search history.

(56) References Cited

U.S. PATENT DOCUMENTS

| | | | | |
|---|---|---|---|---|
| 10,234,037 | B2 * | 3/2019 | Kobayashi | F16J 15/52 |
| 10,975,968 | B2 * | 4/2021 | McFarland | F16J 3/041 |
| 2005/0043486 | A1 | 2/2005 | Okuno | |

FOREIGN PATENT DOCUMENTS

| | | |
|---|---|---|
| JP | 2003-314619 | 11/2003 |
| JP | 2006-308002 | 11/2006 |
| JP | 2010-78149 | 4/2010 |
| JP | 2019-206663 | 12/2019 |
| WO | 2010/024434 | 3/2010 |

OTHER PUBLICATIONS

Response to European Search Opinion filed Apr. 25, 2025 in European (EP) Application No. EP 22 807 361.5. (Year: 2025).*
International Search Report (ISR) issued Jul. 26, 2022 in International (PCT) Application No. PCT/JP2022/019122.

* cited by examiner

FLEXIBLE BOOT FOR CONSTANT VELOCITY UNIVERSAL JOINT AND CONSTANT VELOCITY UNIVERSAL JOINT

TECHNICAL FIELD

The present invention relates to a constant velocity universal joint and a flexible boot for a constant velocity universal joint which are incorporated in a power transmission mechanism of an automobile or various industrial machines.

BACKGROUND ART

A boot attached to a drive shaft or a constant velocity universal joint portion of an axle of an automobile, or a propeller shaft that normally rotates at a high speed is required to have grease resistance (oil resistance), and thus, generally, chloroprene rubber (CR) is used. However, the chloroprene rubber is not sufficient in dynamic ozone resistance and air heat aging resistance, and thus, there is a problem that grease is dissipated by causing a crack in the boot over time. In particular, a tendency of a temperature rise in an engine room of the automobile makes this problem even more serious. For example, a constant velocity universal joint (also abbreviated as "constant velocity joint (CVJ)") mounted on the automobile is sometimes exposed to an atmospheric temperature of 130° C. or higher depending on a place of use, an increase in output of an engine, downsizing of the engine room, and the like.

In this regard, a flexible boot using a hydrogenated nitrile rubber (HNBR) material is also used in order to meet a demand for higher heat resistance (for example, Patent Literature 1).

CITATIONS LIST

Patent Literature

Patent Literature 1: JP H10-159989 A

SUMMARY OF INVENTION

Technical Problems

In recent years, however, the constant velocity universal joint mounted on the automobile is often used under a severe environment, and a flexible boot for a constant velocity universal joint is assumed to be used not only at a high temperature but also at a low temperature such as −40° C., for example. At a low temperature, an elastic modulus of rubber decreases so that problems such as adhesion to a shaft and abnormal deformation at the time of starting may occur, and there is a demand for a flexible boot for a constant velocity universal joint having not only heat resistance but also excellent cold resistance. In general, however, the cold resistance and the oil resistance are inversely proportional to each other, and there is a risk that the oil resistance is deteriorated when the cold resistance is improved.

In addition, the flexible boot for a constant velocity universal joint is used in a severe environment such as centrifugal force accompanying high-speed rotation, large deformation due to a high operating angle, and a stepping stone, and thus, is required to satisfy ozone resistance in order to maintain excellent followability and durability corresponding thereto in addition to temperature conditions and the oil resistance.

An object of the present invention is to provide a flexible boot for a constant velocity universal joint having heat resistance required for a flexible boot for a constant velocity universal joint and sufficiently satisfying cold resistance, oil resistance, and ozone resistance, and a constant velocity universal joint on which the boot is mounted.

Solutions to Problems

In order to achieve such an object, the invention according to claim 1 is a flexible boot for a constant velocity universal joint including: attachment portions to a mating member at both ends; and a bent portion provided between the attachment portions and absorbing deformation caused by operation of a constant velocity universal joint, and being formed using a rubber material obtained by blending 50 to 80 parts by weight of HNBR having an acrylonitrile content of 15 to 21 wt % and 20 to 50 parts by weight of EPDM, the rubber material having an elastic recovery rate of 18% or more at −40° C. in a TR test.

Here, the rubber material preferably swells by 100% or less in an immersion test with IRM 903 oil.

Furthermore, the rubber material preferably has an elastic recovery rate of 21% or more at −40° C. in the TR test.

In addition, the present invention is characterized by being a constant velocity universal joint on which the flexible boot for a constant velocity universal joint according to any one of claims 1 to 3 is mounted.

Advantageous Effects of Invention

The flexible boot for a constant velocity universal joint of the present invention is molded using the rubber material obtained by blending HNBR having the acrylonitrile content of 15 to 21 wt % and EPDM and having the elastic recovery rate of 18% or more at −40° C. in the TR test, and thus, cold resistance, oil resistance, and ozone resistance are all satisfied while heat resistance is maintained.

DESCRIPTION OF EMBODIMENTS

Figure 1:
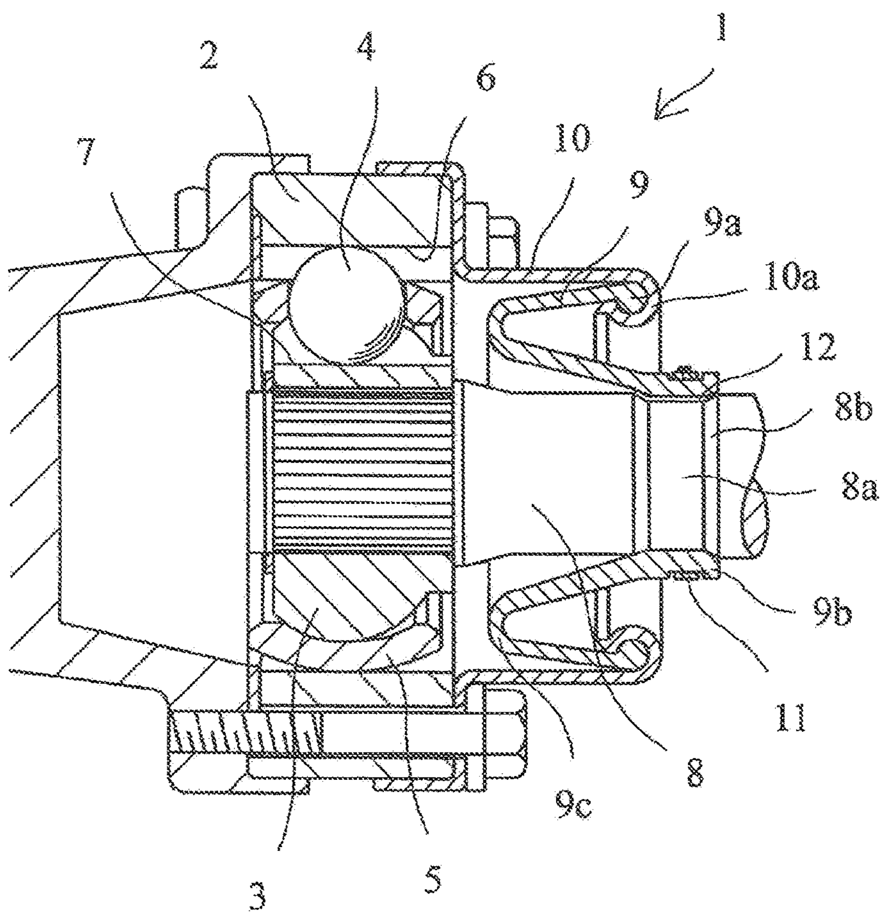
FIG. 1 is a central longitudinal cross-sectional view illustrating an embodiment of a cross groove type constant velocity universal joint and a flexible boot for the same joint to which the present invention is applied.

A flexible boot for a constant velocity universal joint and a constant velocity universal joint of the present invention will be described in detail based on the following embodiments.

The flexible boot for a constant velocity universal joint of the present invention is characterized by being molded using a rubber material obtained using a base rubber material, obtained by blending 50 to 80 parts by weight of a hydrogenated nitrile rubber (HNBR) having an acrylonitrile content of 15 to 21 wt % and 20 to 50 parts by weight of an ethylene propylene diene rubber (EPDM), and having an elastic recovery rate of 18% or more at −40° C. in a cold resistance test (TR test).

It is known that HNBR is excellent in heat resistance (for example, Patent Literature 1). In addition, it is known that HNBR has a trade-off relationship that oil resistance is improved while cold resistance decreases as an addition amount of acrylonitrile increases.

According to experiments by the present inventors, one having an acrylonitrile content of 23 to 26 wt % has an elastic recovery rate of 10% or less in the TR test, and thus, has poor cold resistance and cannot be used as a boot material. On the other hand, one having a low acrylonitrile content has a problem that the oil resistance is lowered, and the balance between the cold resistance and the oil resistance is important in HNBR used as the boot material.

For this reason, the acrylonitrile content in HNBR used in the present invention is preferably in the range of 15 to 21 wt % in which the balance between the cold resistance and the oil resistance is excellent.

In addition, the addition of EPDM makes it possible to achieve both the cold resistance and ozone resistance. In a CVJ boot ozone durability test, breakage was confirmed in a boot in which no EPDM was blended, but it was found that the breakage was improved as a blending amount of EPDM was increased. The ozone resistance was improved by increasing the blending amount of EPDM, and the breakage of the boot was not confirmed when 10 parts by weight or more of EPDM was blended. Furthermore, when 20 parts by weight or more of EPDM was blended, cracking of the boot was not confirmed, and the ozone resistance was further improved. On the other hand, a decrease in the oil resistance was found when an addition ratio of EPDM was increased. That is, excessive blending of EPDM reduces the oil resistance.

In addition, the oil resistance can be improved by suppressing the blending amount of EPDM. As a result of an immersion test with IRM 903 oil, it was found that the rubber material in which the blending amount of EPDM is 50 parts by weight swells by 100% or more, and a rubber material in which the blending amount of EPDM is 40 parts by weight or less swells by 100% or less. It has been empirically known that swelling with grease actually sealed and used in the flexible boot for a constant velocity universal joint is 30% or less when the swelling with the IRM 903 oil is 100% or less, and it has been confirmed that there is no problem in practical durability, sealability, and the like. For this reason, the rubber material preferably swells by 100% or less in the immersion test with the IRM 903 oil.

That is, it has been found that the ozone resistance is improved when the blending amount of EPDM is 10 parts by weight or more and 50 parts by weight or less, and more preferably, ozone resistance can be improved when the blending amount of EPDM is 20 parts by weight or more and 50 parts by weight or less. In particular, when the blending amount of EPDM is 30 to 40 parts by weight, the rubber material swells by 100% or less, and can be applied to severe conditions such as a high speed, a high operating angle, and a high temperature, which is more preferable. Note that the rubber material in which the blending amount of EPDM was 50 parts by weight did not satisfy a requirement of 100% or less for swelling as a result of the experiment, but passed a CVJ boot high-temperature rotation test and a CVJ boot low-temperature rotation test, and it was found that the rubber material can be used as an actual boot depending on a use condition of a constant velocity universal joint.

The cold resistance required as the flexible boot for a constant velocity universal joint can be satisfied by blending EPDM excellent in cold resistance into HNBR having an acrylonitrile content of 15 to 21 wt % and further blending an appropriate type and amount of additives. In a flexible boot for a constant velocity universal joint formed using a rubber material whose elastic recovery rate is less than 18% at −40° C. in a TR test (low-temperature elastic recovery test), slippage occurs in a boot attachment portion at a low temperature from a result of the experiment, and there is a risk that the boot attachment portion and a shaft do not favorably come into close contact with each other to cause abnormal deformation at the start of the boot or a problem in sealability, and this flexible boot is not suitable for use as the boot. On the other hand, in a flexible boot for a constant velocity universal joint formed using a rubber material in which 20 parts by weight or more of EPDM is blended and which has an elastic recovery rate of 18% or more at −40° C. in the TR test (low temperature elastic recovery test), it was found that slippage does not occur in the boot attachment portion at a low temperature, and this flexible boot has sufficient cold resistance as the flexible boot for a constant velocity universal joint.

Herein, a plasticizer and a crosslinking agent will be described. Examples of the plasticizer include ester plasticizers such as a phthalic acid ester type, a polyester type, a phosphoric acid ester type, an adipic acid ester type, a sebacic acid ester type, a citric acid ester type, a benzoic acid ester type, an ether/ester type, an azelaic acid ester type, and a polyether/thioether type, vegetable oil plasticizers such as rapeseed oil, castor oil, and linseed oil, epoxy plasticizers, petroleum aromatic process oil, naphthenic rubber oil, and paraffinic rubber oil which are generally used as plasticizers or softeners for rubber.

Examples of the crosslinking agent include a sulfur crosslinking agent, a thermosetting resin crosslinking agent, and a peroxide crosslinking agent which are generally used for rubbers. In this test, the peroxide crosslinking agent was used.

As the peroxide crosslinking agent, dicumyl peroxide, di-t-butyl peroxide, t-butylcumyl peroxide, benzoyl peroxide, 2,5-dimethyl-2,5-di (t-butylperoxy) hexyne-3, 2,5-dimethyl-2,5-di (benzoylperoxy) hexyne, $\alpha,\alpha'$-bis (t-butylperoxy-m-isopropyl) benzene, or the like can be used.

From results of tests of the present inventors, it has been found that a flexible boot for a constant velocity universal joint can have required heat resistance and also satisfy cold resistance, oil resistance, and ozone resistance when the flexible boot for a constant velocity universal joint is molded using a rubber material obtained using a base rubber material, obtained by blending 50 to 80 parts by weight of HNBR having an acrylonitrile content of 15 to 21 wt % and 20 to 50 parts by weight of EPDM, and having an elastic recovery rate of 18% or more at −40° C. in the TR test. In particular, when the molding is performed using a rubber material obtained by blending 60 to 70 parts by weight of HNBR having an acrylonitrile content of 15 to 21 wt % and 30 to 40 parts by weight of EPDM and having an elastic recovery rate of 21% or more at −40° C. in the TR test, higher oil resistance, cold resistance, and ozone resistance can be obtained.

Hereinafter, features of the flexible boot for a constant velocity universal joint of the present invention will be described.

Regarding Heat Resistance

A flexible boot for a constant velocity universal joint formed using a rubber material, obtained by blending an ethylene propylene diene rubber (EPDM) into a hydrogenated nitrile rubber (HNBR) having heat resistance and having an acrylonitrile content of 15 to 21 wt % to obtain a base rubber material and further blending an appropriate amount of an appropriate additive, has sufficient heat resistance as a flexible boot for a constant velocity universal joint without being confirmed to be broken in the CVJ boot high-temperature rotation test.

Regarding Cold Resistance

When an elastic recovery rate at −40° C. in the TR test of a rubber material, obtained by blending an appropriate amount of EPDM and an appropriate amount of an appropriate additive into HNBR having an acrylonitrile content of 15 to 21 wt %, is 18% or more, a flexible boot for a constant velocity universal joint using this rubber material has no problem occurs in the CVJ boot low-temperature rotation test, and has sufficient cold resistance. On the other hand, in the CVJ boot low-temperature rotation test of the flexible boot for a constant velocity universal joint using a rubber material having an elastic recovery rate of less than 18%, slippage occurs in a boot attachment portion, and there is a risk that the boot attachment portion and a shaft do not favorably in close contact with each other at a low temperature to cause abnormal deformation at the time of starting the boot or a problem in sealability, and thus, this flexible boot is not suitable for use as the boot.

Regarding Oil Resistance

A rubber material obtained by blending 0 to 40 parts by weight of EPDM and an appropriate amount of an appropriate additive into HNBR having an acrylonitrile content of 15 to 21 wt % has swelling of 100% or less in the immersion test with the IRM 903 oil, and has high oil resistance. A flexible boot for a constant velocity universal joint using the rubber material having the swelling of 100% or less has sufficient durability with a small amount of swelling or reduction in hardness due to grease and with less deformation and abnormal wear caused by contact when a joint has a high operating angle or rotates at a high speed. On the other hand, swelling of a rubber material obtained by blending 50 parts by weight of EPDM exceeds 100%. Thus, a flexible boot for a constant velocity universal joint formed using such a rubber material has a risk of coming into contact with another site of the boot to cause abnormal wear when a joint has a high operating angle, or being abnormally deformed and broken at the time of high-speed rotation. However, this flexible boot can be used as long as the constant velocity universal joint does not have a high operating angle or is used for low-speed rotation.

Regarding Ozone Resistance

In a test of durability against ozone using a flexible boot for a constant velocity universal joint, breakage of the boot was confirmed in the case of using HNBR alone. The ozone resistance was improved by increasing the blending amount of EPDM, and the breakage of the boot was not confirmed when 10 parts by weight or more of EPDM was blended. When 20 parts by weight or more of EPDM was blended, cracking of the boot was not confirmed, and the ozone resistance was further improved.

The rubber material according to the above-described embodiment can satisfy all of the heat resistance, the cold resistance, the oil resistance, and the ozone resistance, and thus, is suitable for the flexible boot for a constant velocity universal joint.

Here, the constant velocity universal joint is not limited to a specific joint structure, and may adopt any mode. For example, the present invention is not limited to a sliding type constant velocity universal joint having a mechanism that slides in the axial direction of an outer joint member such as a cross groove type illustrated in FIG. 1, a tripod type illustrated in FIG. 2, or a double offset type illustrated in FIG. 3, and can also be used as a fixed type constant velocity universal joint using a ball such as a Rzeppa type or a Birfield type. The tripod type constant velocity universal joint may be either a double roller type or a single roller type.

In addition, a mode of the flexible boot for a constant velocity universal joint mounted on the constant velocity universal joint is not limited to a specific mode, and only need to include attachment portions to a mating member at both ends, and a bent portion that is provided between both the attachment portions and absorbs deformation accompanying operation of the constant velocity universal joint. For example, a boot including a bent portion curved in a U shape, a boot including a bellows-like bent portion having a plurality of ridges and valleys, or a boot including a bent portion having one ridge and one valley may be used.

Specifically, as illustrated in FIG. 1, a cross groove type constant velocity universal joint 1 includes: an inner joint member 3 in which a plurality of track grooves 7 are formed on an outer peripheral surface; and an outer joint member 2 which is located on the outer periphery of the inner joint member 3 and in which the same number of track grooves 6 as the number of the track grooves 7 of the inner joint member 3 are formed on an inner peripheral surface. The track grooves 7 of the inner joint member 3 and the track grooves 6 of the outer joint member 2 form angles inclined in opposite directions with respect to the axis, and a ball 4 is incorporated in an intersection portion between the track groove 7 and the track groove 6 forming a pair. A cage 5 is arranged between the inner joint member 3 and the outer joint member 2, and the ball 4 is held in a pocket of the cage 5.

Here, a boot 9 is mounted between the outer joint member 2 and a shaft 8 connected to the inner joint member 3 via an annular member 10 mounted on the outer joint member 2, and covers the constant velocity universal joint so as to seal the constant velocity universal joint. A lubricant such as grease (not illustrated) is sealed in such a sealed space. The boot 9 includes: an outer tube end portion (large-diameter attachment portion) **9*a* fixed to an end portion of the annular member 10 mounted on the outer joint member 2; an inner tube end portion (small-diameter attachment portion) 9*b* fixed to the shaft 8 connected to the inner joint member 3; and a bellows portion that is provided therebetween and has a bent portion 9*c* curved in a U shape. Since the bent portion 9*c* largely curved in a U shape is provided, whirling of the bent portion of the boot when the cross groove type constant velocity universal joint 1** rotates at a high speed is suppressed, and durability of the boot is improved.

In addition, the outer tube end portion **9*a* of the boot 9 is sealed by being fixed to the annular member 10. As a fixing method, as illustrated in FIG. 1, a method of providing a recessed portion 10*a* in the annular member 10 and fitting a distal end of the outer tube end portion 9*a* of the boot 9 to the recessed portion 10*a* to caulk the recessed portion 10*a* of the annular member 10 may be used. Note that this method of fixing the outer tube end portion 9*a* and the annular member 10 is an example, and the present invention is not limited thereto. For example, the outer tube end portion 9*a* may be fixed to the annular member 10 by a fastening band 11 or the like, or the annular member 10 may be integrally molded with the boot 9 in advance and mounted on the outer joint member 2. Reference sign 12 in the drawing denotes an air vent groove having a size that does not allow leakage of grease filling the inside the boot. Note that the annular member 10** is generally formed using a metal ring made of iron, but may be made of another metal such as aluminum or resin.

Furthermore, the inner tube end portion 9*b* of the boot 9 is sealed by being fixed to the shaft 8. A boot groove 8*a* is formed on an outer peripheral surface of a site where the inner tube end portion 9*b* of the shaft 8 is fixed, and the inner tube end portion 9*b* is fitted to the boot groove 8*a* and fixed with a fastening band or the like. In addition, the inner tube end portion 9*b* in the boot groove 8*a* can be more firmly fixed to the shaft 8 by providing annular protruding portions 8*b* on both sides of the boot groove 8*a*.

Figure 2:
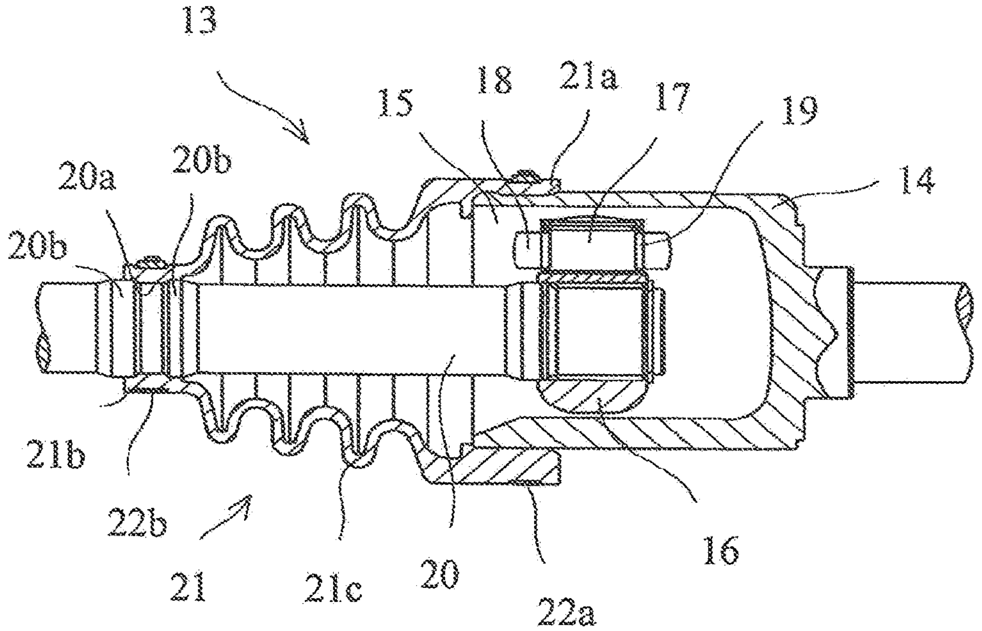
FIG. 2 is a central longitudinal cross-sectional view illustrating an embodiment of a tripod type constant velocity universal joint and a flexible boot for the same joint to which the present invention is applied.

FIG. 2 illustrates an embodiment of the tripod type constant velocity universal joint. In a tripod type constant velocity universal joint 13, three linear track grooves 15 in the axial direction are formed on an inner surface of an outer joint member 14. A tripod member (inner joint member) 16 incorporated on the inner side of the outer joint member 14 is provided with three journals 17. A spherical roller 18 is inserted on the outer side of each of the journals 17, a needle 19 is incorporated between the spherical roller 18 and the journal 17 to support the spherical roller 18 to be rotatable and axially slidable, and the spherical roller 18 is rollably inserted into the track groove 15. A boot 21, which is a molded body of the above-described rubber composition, is mounted from the outer joint member 14 to a shaft 20 connected to the tripod member 16.

Here, the boot 21 includes an outer tube end portion (large-diameter attachment portion) 21*a* fitted and fixed to the outer joint member 14, an inner tube end portion (small-diameter attachment portion) 21*b* fitted and fixed to the shaft 20 connected to the inner joint member 16, and a bellows-like bent portion (hereinafter, also referred to as a "bellows portion") 21*c* having a plurality of ridges and valleys connecting the outer tube end portion 21*a* and the inner tube end portion 21*b*, and covers the constant velocity universal joint so as to seal the constant velocity universal joint. A lubricant such as grease (not illustrated) is sealed in such a sealed space. In the boot 21, the outer tube end portion 21*a* is fitted to the outer joint member 14 and fixed with a fastening band 22*a* or the like, and the inner tube end portion 21*b* is fixed to the shaft 20 with a fastening band 22*b* or the like. A boot groove 20*a* is formed in an outer peripheral surface of a site where the inner tube end portion 21*b* of the shaft 20 is fixed, and the inner tube end portion 21*b* is fitted into the boot groove 20*a*. Note that the inner tube end portion 21*b* in the boot groove 20*a* can be more firmly fixed to the shaft 20 by providing annular protruding portions 20*b* on both sides of the boot groove 20*a*.

Figure 3:
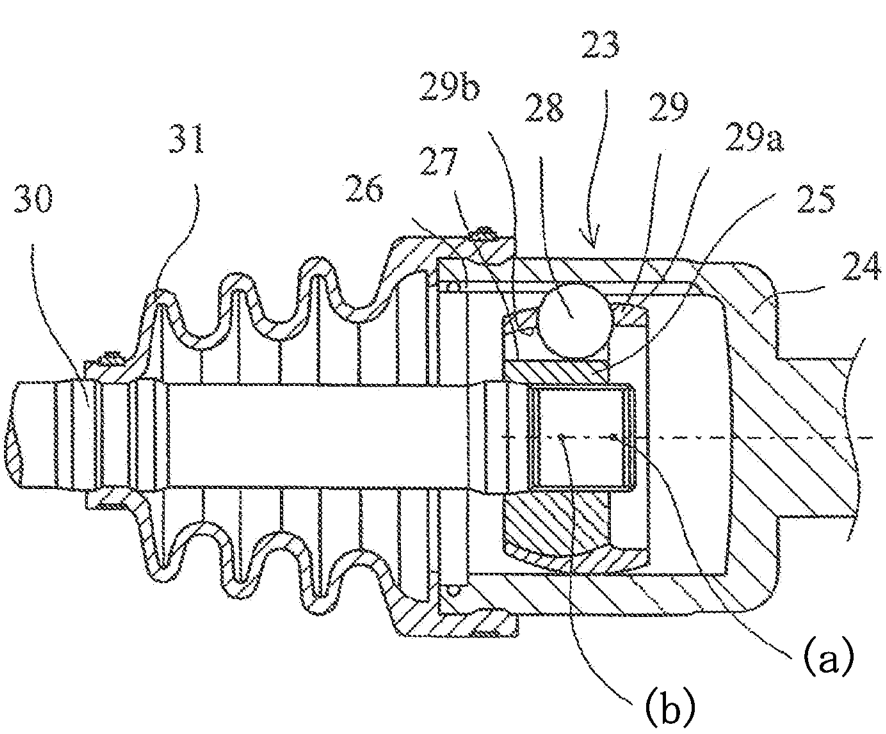
FIG. 3 is a central longitudinal cross-sectional view illustrating an embodiment of a double offset type constant velocity universal joint and a flexible boot for the same joint to which the present invention is applied.

Furthermore, FIG. 3 illustrates an embodiment of the double offset type constant velocity universal joint. In a double offset type constant velocity universal joint 23, a plurality of linear track grooves 26 and 27 in the axial direction are formed on an inner surface of an outer joint member 24 and an outer surface of an inner ring (inner joint member) 25. A ball 28 incorporated between the track grooves 26 and 27 is supported by a cage 29, the outer periphery of the cage 29 is a spherical surface 29*a*, and the inner periphery is a spherical surface 29*b* conforming to the outer periphery of the inner ring 25. Centers (a) and (b) of the spherical surfaces 29*a* and 29*b* are misaligned in the axial direction on the axial center of the outer joint member 24. A boot 31, which is a molded body of the above-described rubber composition, is mounted from the outer joint member 24 to a shaft 30 connected to the inner ring 25. Note that a structure and a mounting structure of the boot 31 are similar to those of the boot 21 in FIG. 2. In addition, a lubricant such as grease (not illustrated) is sealed in a space sealed by the boot 31.

In FIGS. 2 and 3, in a bellows shape of each of the boots 21 and 31, a curvature of an outer peripheral surface of a valley portion of the bellows portion is smaller than a curvature of an outer peripheral surface of a ridge portion. That is, a radius of the curve of the valley portion of the bellows is set to be larger than a radius of the curve of the ridge portion to suppress deformation of a compression-side phase of the valley portion of the boot at the time of taking an operating angle, thereby improving durability of the valley portion. When the curvature of the outer peripheral surface of the valley portion is equal to or larger than the curvature of the outer peripheral surface of the ridge portion, the valley portion is greatly crushed so that a starting point of a crack is likely to occur.

In addition, it is also possible to adopt a structure in which a connecting portion which is smoothly continuous with the small-diameter attachment portion and has an outer surface formed in an arc shape having a center of curvature outside the boot is provided in an end portion of the bellows portion on the small-diameter attachment portion side, a radius of curvature of the outer surface of the connecting portion is set to be larger than a radius of curvature of an outer surface of the ridge portion of the bellows portion, and a thickness at any point of the connecting portion is equal to or larger than a thickness at an end portion of the connecting portion on the large-diameter attachment portion side.

In addition, it is also possible to adopt a structure in which the small-diameter attachment portion includes a shaft mounting portion in which a fitting groove for mounting a boot band is formed on an outer diameter surface thereof, and a thin portion connected to the bellows portion from the shaft mounting portion via a thick portion to allow buckling displacement with respect to the shaft mounting portion and the bellows portion.

Furthermore, it is also possible to adopt a structure in which the boot band is an annular body having no folded portion, an axially outer peripheral edge portion of the boot band has a shape bent toward the outer diameter side or has a curved shape, and a gap is formed between the axially outer peripheral edge portion and a bottom end portion of the fitting groove of the boot corresponding thereto in a diameter-reduced state of the boot band to avoid interference.

A constant velocity universal joint used for an automobile propulsion shaft (propeller shaft) on which a boot that is a molded body of the above-described predetermined rubber composition and has the above-described structure is mounted has excellent heat resistance, cold resistance, oil resistance, and ozone resistance.

Note that the above-described mode is an example of a preferred mode of the present invention, but the present invention is not limited thereto, and various modifications can be made without departing from the gist of the present invention.

Examples

Various rubber materials (Examples 1 to 4 and Comparative Examples 1 to 4) were prepared while varying a blending ratio between HNBR and EPDM and types and amounts of additives, and a TR test, a CVJ boot low-temperature rotation test, a CVJ boot high-temperature rotation test, a CVJ boot ozone durability test, and an immersion test with IRM 903 oil were performed. Note that, in the present tests, as HNBR to be a base rubber material, HNBR having an acrylonitrile content of 15 to 21 wt % for achieving both heat resistance and cold resistance required for a flexible boot for a constant velocity universal joint was used.

[Boot Shape]

In the present tests, the flexible boot for a constant velocity universal joint illustrated in FIG. 1 was used.

Compositions and various test results of Examples and Comparative Examples are shown in Table 2 as follows.

TABLE 2

| | Example | | | | Comparative Example | | | |
|---|---|---|---|---|---|---|---|---|
| | 1 | 2 | 3 | 4 | 1 | 2 | 3 | 4 |
| HNBR | 50 | 60 | 70 | 80 | 90 | 100 | 70 | 70 |
| EPDM | 50 | 40 | 30 | 20 | 10 | 0 | 30 | 30 |
| Plasticizer | 30 (A) | 30 (A) | 30 (A) | 30 (A) | 30 (A) | 30 (A) | 30 (A) | 30 (B) |
| Peroxide crosslinking agent | 10 | 10 | 10 | 10 | 10 | 10 | 3 | 10 |
| Carbon black | 70 | 70 | 70 | 70 | 70 | 70 | 70 | 70 |
| TR test (elastic recovery) determination (18% or more) | ◎ 21% or more | ◎ 21% or more | ◎ 21% or more | ○ | X | X | X | X |
| CVJ boot low-temperature rotation test | No slippage | No slippage | No slippage | No slippage | Slippage occurs | Slippage occurs | Slippage occurs | Slippage occurs |
| CVJ boot high-temperature rotation test | ○ | ○ | ○ | ○ | ○ | | | |
| CVJ boot ozone durability test | ○ | ○ | ○ | ○ | Δ | X | | |
| Determination in immersion test with IRM 903 oil (100% or less) | Δ | ○ | ○ | ○ | ○ | ○ | | |
| Overall determination | Δ | ◎ | ◎ | ○ | X | X | X | X |
| Usability of boot | Cold resistance and ozone resistance are satisfied | Oil resistance, cold resistance, and ozone resistance are satisfied | Oil resistance, cold resistance, and ozone resistance are satisfied | Oil resistance, cold resistance, and ozone resistance are satisfied | Cold resistance is not satisfied | Cold resistance and ozone resistance are not satisfied | Cold resistance is not satisfied | Cold resistance is not satisfied |

Here, in Examples 1 to 4 and Comparative Examples 1 to 2, 50 to 100 parts by weight of HNBR and 0 to 50 parts by weight of EPDM were blended, and 30 parts by weight of an ester plasticizer, 10 parts by weight of a peroxide crosslinking agent, and 70 parts by weight of carbon black were blended.

In Comparative Example 3, 70 parts by weight of HNBR and 30 parts by weight of EPDM were blended, and 30 parts by weight of an ester plasticizer, 3 parts by weight of a peroxide crosslinking agent, and 70 parts by weight of carbon black were blended.

In Comparative Example 4, 70 parts by weight of HNBR and 30 parts by weight of EPDM were blended, and 30 parts by weight of a vegetable oil plasticizer, 10 parts by weight of a peroxide crosslinking agent, and 70 parts by weight of carbon black were blended.

Chemicals used in this test are as follows.

TABLE 1

| Chemicals | |
|---|---|
| HNBR | Acrylonitrile content 15 to 21 wt % |
| EPDM | Ethylene content 55% or less ENB content 6% or more |
| Plasticizer | Plasticizer A (ester plasticizer) Plasticizer B (vegetable oil plasticizer) |
| Crosslinking agent | Peroxide crosslinking agent |
| Reinforcing agent | Carbon black |
| Other additives | Lubricant, antioxidant, etc. |

Note that, in the present tests, the ester plasticizer was used as a plasticizer A in Examples, and the vegetable oil plasticizer was used as a plasticizer B in Comparative Example 4. In addition, as a crosslinking agent, the peroxide crosslinking agent was used.

[TR Test]

A TR test of a rubber material obtained by blending EPDM into HNBR having an acrylonitrile content of 15 to 21 wt % and a low-temperature rotation test of the flexible boot for a constant velocity universal joint were performed.

For the TR test, data acquired with reference to ISO 2921 was used to confirm a restoration rate at −40° C.

In Examples 1 to 4 and Comparative Examples 1 to 2, the types and amounts of the additives were fixed, and the blending ratio between HNBR and EPDM was changed. The elastic recovery rate was 18% or more in Examples 1 to 4 in which the blending amount of EPDM was 20 parts by weight or more. On the other hand, the elastic recovery was less than 18% in Comparative Examples 1 to 2 in which the blending amount of EPDM was 10 parts by weight or less.

In Comparative Example 3 obtained by setting the blending ratio between HNBR and EPDM to be the same as that in Example 3 and changing a blending amount of the crosslinking agent, the elastic recovery rate was less than 18%.

In Comparative Example 4 obtained by setting the blending ratio between HNBR and EPDM to be the same as that in Example 3 and changing the type of the plasticizer, the elastic recovery rate was less than 18%.

From the results of the test, it has been found that a sufficient elastic recovery rate is obtained when the types and amounts of the additives are appropriately blended and a blending amount of EPDM is 20 parts by weight or more. A rubber material obtained by blending 30 parts by weight or more of EPDM has an elastic recovery rate of 21% or more, which is more preferable.

[CVJ Boot Low-Temperature Rotation Test]

In the CVJ boot low-temperature rotation test, slippage of the boot attachment portion was confirmed under conditions of an operating angle of 5 deg, an atmospheric temperature of −40° C., a rotation speed of 500 rpm, and a durability cycle of 10 cyc.

When the low-temperature rotation test was performed with the flexible boot for a constant velocity universal joint formed using the rubber material having the elastic recovery rate of 18% in Example 4, it was confirmed that the slippage of the boot attachment portion slightly occurred in a part, but sufficient cold resistance was obtained.

When the low-temperature rotation test was performed with the flexible boot for a constant velocity universal joint formed using the rubber material having the elastic recovery rate of 21% or more in Examples 1 to 3, it was confirmed that the slippage of the boot attachment portion did not occur, and higher cold resistance was obtained.

On the other hand, when the low-temperature rotation test was performed with the flexible boot for a constant velocity universal joint formed using the rubber material having the elastic recovery rate of less than 18% in Comparative Examples 1 to 4, the slippage occurred in the boot attachment portion. When the blending amount of EPDM was 20 parts by weight or more, the elastic recovery rate was 18% or more, and there was no problem in the low-temperature rotation test (there was no slippage of the boot attachment portion), so that it could be determined that sufficient cold resistance was obtained. When the blending amount of EPDM was 30 parts by weight or more, the elastic recovery rate was 21% or more, and slippage did not occur in the boot attachment portion, which can be said to be more preferable.

[CVJ Boot High-Temperature Rotation Test]

In the CVJ boot high-temperature rotation test, high-temperature durability of the boot was confirmed under conditions of an operating angle of 5 deg, an atmospheric temperature of 130° C., a rotation speed of 2700 rpm, and an operation time of 550 h.

In Examples 1 to 4 and Comparative Example 1, breakage of the boot was not confirmed, and it was confirmed that the durability under a high temperature was obtained. Note that the test was omitted for Comparative Examples 2 to 4 were omitted.

[CVJ Boot Ozone Durability Test]

In the CVJ boot ozone durability test, ozone durability of the boot was confirmed under conditions of an ozone concentration of 200 pphm, an operating angle of 5 deg, an atmospheric temperature of 40° C., a rotation speed of 1200 rpm, and an operation time of 200 h.

In Examples 1 to 4, no crack was confirmed after operation for 200 h, and ozone durability was good. In Comparative Example 1, the boot was not broken and was in an operable state, but a crack was confirmed. In Comparative Example 2, the boot was broken and was inoperable. Note that the test was omitted for Comparative Examples 3 and 4.

From this, it has been confirmed that blending EPDM into HNBR improves ozone resistance, and the flexible boot for a constant velocity universal joint using the rubber material obtained by blending 20 parts by weight or more of EPDM has high ozone resistance with no confirmed crack.

[Immersion Test with IRM 903 Oil]

[Regarding Grease Sealed in Constant Velocity Universal Joint on which Boot is Mounted]

Grease is sealed in the constant velocity universal joint on which the boot is mounted. Components of the grease include a base grease formed of a thickener and base oil. In addition, the base grease may be blended with various additives.

Examples of the thickener for the grease include soaps such as a lithium soap, a lithium complex soap, a calcium soap, a calcium complex soap, an aluminum soap, and an aluminum complex soap, and urea compounds such as a diurea compound and a polyurea compound, but are not particularly limited thereto.

Examples of the urea thickener include a diurea compound and a polyurea compound, but are not particularly limited thereto.

The diurea compound is obtained, for example, by a reaction of a diisocyanate with a monoamine. Examples of the diisocyanate include phenylene diisocyanate, diphenyl diisocyanate, phenyl diisocyanate, diphenylmethane diisocyanate, octadecane diisocyanate, decane diisocyanate, and hexane diisocyanate, and examples of the monoamine include octylamine, dodecylamine, hexadecylamine, octadecylamine, oleylamine, aniline, p-toluidine, and cyclohexylamine.

The polyurea compound is obtained, for example, by a reaction of a diisocyanate with a monoamine or a diamine. Examples of the diisocyanate and the monoamine include those used for producing the diurea compound, and examples of the diamine include ethylenediamine, propanediamine, butanediamine, hexanediamine, octanediamine, phenylenediamine, tolylenediamine, and xylenediamine.

Examples of the base oil of the grease include commonly used lubricating oils such as paraffinic and naphthenic mineral oils, ester synthetic oils, ether synthetic oils, hydrocarbon synthetic oils, GTL base oils, fluorine oils, and silicone oils, or mixed oils thereof, but are not limited thereto. In general, the mineral oils are often used in consideration of cost, but the synthetic oils and mixed oils thereof may be used in consideration of a temperature range of use.

In addition, lubricating components may further include various additives such as solid lubricants such as molybdenum disulfide and graphite, friction modifiers such as organomolybdenum, oily agents such as amines, fatty acids, and fats, antioxidants such as amine or phenol antioxidants, rust inhibitors such as petroleum sulfonate, dinonyl naphthalene sulfonate, and sorbitan ester, sulfur or sulfur-phosphorus extreme pressure agents, organozinc or phosphorus antiwear agents, metal deactivators such as benzotriazole and sodium nitrite, and viscosity index improvers such as polymethacrylate and polystyrene.

[Regarding Immersion Test]

An actual boot for a constant velocity universal joint is used in combination with various types of grease. The flexible boot for a constant velocity universal joint and a constant velocity universal joint on which the boot is mounted are most affected by a base oil of the grease to be sealed, and thus, it is necessary to perform a test with a standard oil having a component close to the base oil of the grease that is actually used.

In this regard, as the standard oil for an immersion test, IRM 903 oil (a humoral test standard oil used for JIS K 6258 ASTM D471 standard inspection of rubber parts) containing substantially the same amount of paraffinic and naphthenic mineral oils was selected, and oil resistance against the IRM 903 oil was confirmed and used as an index of usability as a boot material for a constant velocity universal joint that is normally used in contact with grease.

The swelling of rubber is greatly affected by an aniline point. The IRM 903 oil used in the immersion test has a low aniline point of 70° C., and thus, is used for testing as a standard grease having a strong tendency to swell rubber.

Note that, in a flexible boot for a constant velocity universal joint, expansion of a rubber material itself does not impair the performance as the boot, and deteriorations in various physical properties due to expansion of the volume cause a problem. It has been empirically known that swelling with grease actually sealed and used in the flexible boot for a constant velocity universal joint is 30% or less when the swelling with the IRM 903 oil is 100% or less, and it has been confirmed that there is no problem in practical durability, sealability, and the like. In this regard, whether or not the swelling was 100% or less was used as a criterion for the determination.

The swelling was measured using data acquired with reference to ISO 1817, and a physical property change rate of the rubber material after immersion in the IRM 903 oil at a set temperature of 100° C. for 72 hours was confirmed.

As a result of the test, the swelling of the rubber material was 100% or less in Examples 2 to 4 and Comparative Examples 1 to 2 in which the blending amount of EPDM was 40 parts by weight or less. The flexible boot for a constant velocity universal joint using this rubber material can suppress contact with the surroundings and abnormal wear. Therefore, this flexible boot can be applied to severe conditions such as a high speed, a high operating angle, and a high temperature, and can be said to be more preferable as a rubber material of a flexible boot for a constant velocity universal joint. On the other hand, the swelling of the rubber material was 100% or more in Example 1 in which the blending amount of EPDM was 50 parts by weight. Thus, it has been confirmed that the oil resistance is improved by suppressing the blending amount of EPDM. Note that the test was omitted for Comparative Examples 3 and 4.

Here, the rubber material of Example 1 in which the blending amount of EPDM was 50 parts by weight had the swelling of 100% or more, but passed the CVJ boot high-temperature rotation test and the CVJ boot low-temperature rotation test, and thus, can be said to be usable as an actual boot. In addition, EPDM was blended in order to improve the ozone resistance, but the oil resistance was deteriorated if EPDM was blended at a certain amount or more (see Example 1). It has been confirmed that the oil resistance is deteriorated due to the blending of the certain amount or more of EPDM, and the cold resistance and the oil resistance are inversely proportional to each other.

From the above various test results, it has been confirmed that the flexible boot for a constant velocity universal joint formed using the rubber material, which is obtained by blending 30 parts by weight of the ester plasticizer, 10 parts by weight of the peroxide crosslinking agent, 70 parts by weight of carbon black, 50 to 80 parts by weight of HNBR having the acrylonitrile content of 15 to 21 wt %, and 20 to 50 parts by weight of EPDM and has the elastic recovery rate of 18% or more at −40° C. in the TR test, and the constant velocity universal joint on which the boot is mounted have heat resistance and also satisfy functions of cold resistance and ozone resistance.

Furthermore, it has been confirmed that the flexible boot for a constant velocity universal joint formed using the rubber material, which swells by 100% or less in the immersion test with the IRM 903 oil, and the constant velocity universal joint on which the boot is mounted satisfy a function of high oil resistance in addition to the above functions.

Therefore, the flexible boot for a constant velocity universal joint formed using the rubber material and the constant velocity universal joint on which the boot is mounted according to the present invention can be suitably used as a constant velocity universal joint used for a drive shaft for an automobile or a propeller shaft for an automobile or a universal joint for various machines. In particular, the flexible boot for a constant velocity universal joint according to the present invention can be suitably used as a boot for the inboard side of the drive shaft where temperature is likely to be high or a boot for a propeller shaft.

REFERENCE SIGNS LIST

1, 13, 23 Constant velocity universal joint
9, 21, 31 Flexible boot

The invention claimed is:

1. A flexible boot for a constant velocity universal joint comprising:

attachment portions to a mating member at both ends; and a bent portion provided between the attachment portions and absorbing deformation caused by operation of a constant velocity universal joint, the flexible boot being made of a rubber material obtained by blending 50 to 80 parts by weight of HNBR having an acrylonitrile content of 15 to 21 wt % and 20 to 50 parts by weight of EPDM, the rubber material having an elastic recovery rate of 18% or more at −40° C. in a TR test.

2. The flexible boot for a constant velocity universal joint according to claim 1, wherein the rubber material swells by 100% or less in an immersion test with IRM 903 oil.

3. The flexible boot for a constant velocity universal joint according to claim 1, wherein the rubber material has an elastic recovery rate of 21% or more at −40° C. in the TR test.

4. A constant velocity universal joint on which the flexible boot for a constant velocity universal joint according to claim 1 is mounted.

* * * * *